United States Patent

Burton et al.

[11] Patent Number: 5,411,119
[45] Date of Patent: May 2, 1995

[54] INTERNAL SHOE-DRUM BRAKE ADJUSTER CAM WITH LEVERAGE PROJECTIONS FOR BRAKE DISENGAGEMENT

[75] Inventors: Keith Burton; Timothy J. Hunt, both of Gwent, Wales

[73] Assignee: Lucas Industries, West Midlands, England

[21] Appl. No.: 712,524

[22] Filed: Jun. 10, 1991

[30] Foreign Application Priority Data

Jun. 19, 1990 [GB] United Kingdom ............... 9013612

[51] Int. Cl.⁶ .................. F16D 65/52; F16D 51/18
[52] U.S. Cl. .................. 188/79.51; 188/79.57; 188/196 BA; 192/101; 192/111 A
[58] Field of Search .... 188/79.51, 79.53, 79.56–79.58, 188/79.62–79.63, 196 B, 196 BA; 192/111 A, 111 R, 101

[56] References Cited

U.S. PATENT DOCUMENTS

| | | | |
|---|---|---|---|
| 2,562,356 | 7/1951 | House | 188/78 |
| 2,978,072 | 4/1961 | Burnett | 188/79.56 |
| 3,581,847 | 6/1971 | Torii et al. | 188/79.54 |
| 3,858,463 | 1/1975 | Klavonich | 188/79.51 X |
| 3,913,710 | 10/1975 | Margetts | 188/79.62 |
| 3,991,861 | 11/1976 | Hayashida | 188/79.54 |
| 3,998,297 | 12/1976 | Aono | 188/79.54 |
| 4,645,040 | 2/1987 | Knott et al. | 188/79.63 |
| 4,922,771 | 5/1990 | Campbell | 81/484 |

FOREIGN PATENT DOCUMENTS

| | | |
|---|---|---|
| 0123730 | 11/1984 | European Pat. Off. . |
| 2530930 | 1/1977 | Germany . |
| 1405094 | 9/1972 | United Kingdom . |
| 1405094 | 9/1975 | United Kingdom . |
| 1507550 | 4/1978 | United Kingdom . |
| 2103738 | 2/1983 | United Kingdom . |

Primary Examiner—Matthew C. Graham
Assistant Examiner—Josie A. Ballato
Attorney, Agent, or Firm—Staas & Halsey

[57] ABSTRACT

An internal shoe-drum type brake has a pair of shoes separable by an actuator into braking engagement with a brake drum. An automatic adjuster includes a two-part strut extending between the shoes, the first strut part being pivotally mounted on the second strut part and cooperating with the latter via teeth on the second part, such that the first strut part is separated from the teeth when excessive shoe separation occurs upon brake actuation and is moved angularly to a new position of adjustment upon brake release. The first strut part is provided with a number of peripheral projections engagable by an external tool to disengage the first part from the teeth of the second part when it is desired to de-adjust the adjuster in order to facilitate drum removal.

14 Claims, 2 Drawing Sheets

INTERNAL SHOE-DRUM BRAKE ADJUSTER CAM WITH LEVERAGE PROJECTIONS FOR BRAKE DISENGAGEMENT

This invention relates to an internal shoe-drum brake, primarily for a motor vehicle, of the general kind having a pair of brake shoes separable by actuating means into braking engagement with a brake drum, and an automatic adjuster in the form of a strut extending between the shoes which includes a pair of strut parts of which one is an adjuster element pivotally mounted on the other strut part and cooperating with toothed means rigid with said other part, the strut parts being operatively associated respectively with the shoes in such a manner that excessive separation of the brake shoes upon brake actuation results in separation of the adjuster element from the toothed means and angular movement of the element, enabling the element to reengage the toothed means in a fresh position, upon brake release, to increase the effective length of the strut and thereby set a new outwardly adjusted retracted position of the shoes. An example of such a brake is described in our British Patent No. 1405094.

The drum of an internal shoe drum brake can become grooved by one or both of the shoes over long service and continual adjustment of the shoes to maintain a substantially constant shoe to drum clearance, particularly when an automatic adjuster is incorporated for this purpose, can make it difficult to remove the drum. When the adjuster is of the aforesaid kind, de-adjustment entails moving the adjuster element generally longitudinally of the strut to disengage it from the other strut part and thereby permit its rotation towards a de-adjusted position. Because the adjuster is essentially of the "one-shot" type, in which all the adjustment required at any one time is performed in one step, the total adjusting movement of the adjuster element over the shoe wear life is substantial. Because of this, difficulties can occur in attempting to achieve sufficient reverse movement of the adjuster element for de-adjustment purposes, particularly when using a tool inserted through a relatively restricted hole formed, for example, in the brake backplate.

SUMMARY OF THE INVENTION

An object of the present invention, therefore, is to provide an internal shoe drum brake of the aforesaid general kind in which a particularly simple and convenient de-adjustment means is provided for the two-part adjuster strut.

According to the present invention, there is provided a brake of the aforesaid general kind in which the pivotal adjuster element is provided with release means arranged generally radially of its pivotal connection with the other strut part for engagement by an external tool in order to move the element generally longitudinally of the strut so as to disengage it from the other strut part and thereby permit its rotation towards a de-adjusted position.

In one convenient arrangement, the release means is arranged on a peripheral portion of the adjuster element and preferably takes the form of a peripherally spaced series of projections arranged to permit engagement of one of them by the tool whatever may be the rotational position of the adjuster element within its normal range of adjusting movement.

BRIEF DESCRIPTION OF THE DRAWINGS

The invention will now be described, by way of example, with reference to the accompanying drawings in which.

DESCRIPTION OF THE PREFERRED EMBODIMENT

Figure 1:
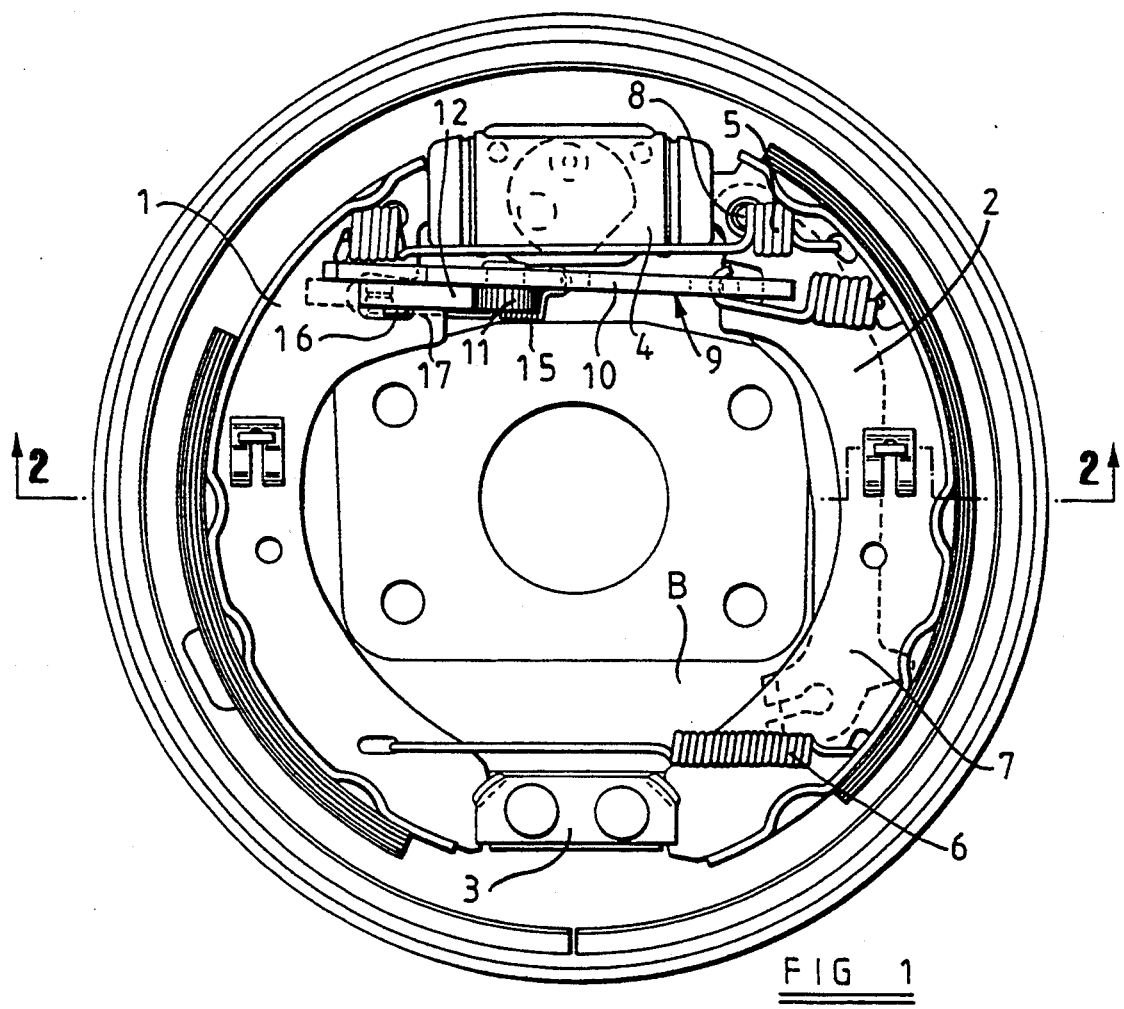
FIG. 1 is a front elevation of one form of the internal shoe drum brake of the invention.
Figure 2:
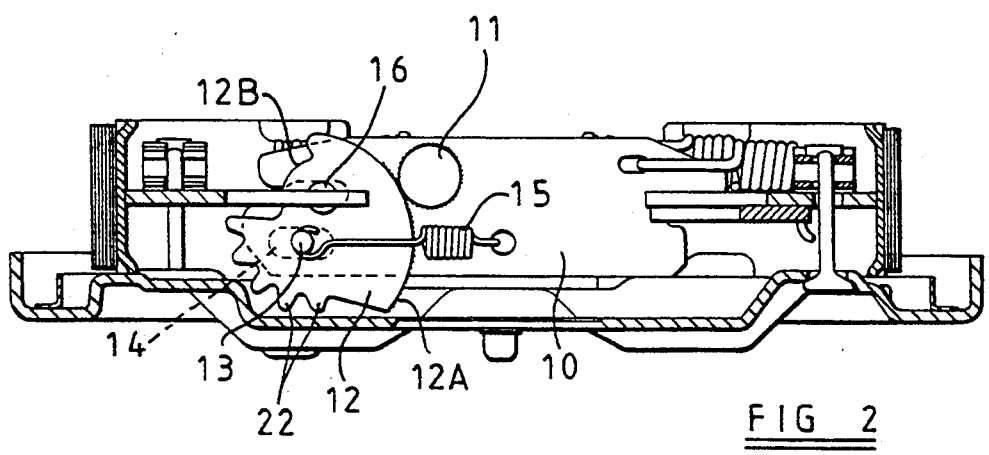
FIG. 2 is a cross-section along the line 2—2 of FIG. 1.

FIGS. 1 and 2 of the drawings illustrate an internal shoe drum brake having a pair of brake shoes 1 and 2 mounted on a backplate B and arranged within a brake drum. The shoes have one pair of adjacent ends in engagement with a fixed abutment 3 and the other pair of adjacent ends cooperate with an hydraulic actuator 4, operation of which separates the shoes into braking engagement with the drum against the action of return springs 5 and 6. Alternative actuation of the shoes is provided by way of a mechanical actuator lever 7 pivoted at 8 on the web of the shoe 2, the lever 7 engaging a strut, indicated generally at 9, which extends across the brake at a location adjacent the actuator 4 into engagement with the shoe 1. Angular clockwise movement of the lever 7 about the pivot 8 first urges the shoe 1 against the drum and thereafter, the lever pivots about the right hand end of the strut and, by reaction thereagainst, applies the shoe 2 against the drum, in a conventional manner.

The strut 9 forms part of a two-part assembly acting as an automatic adjuster. One part is in the form of an elongate plate 10 extending between the shoes and carrying a projection 11 rigidly secured to its underside at an intermediate location therealong, the outer surface of the projection having teeth formed thereon, as for example by knurling. The other part of the strut assembly is an adjuster element 12 pivoted on the underside of the plate 10 by means of a pin 13 rigidly secured to the plate 10 and extending downwardly therefrom into a longitudinal slot 14 formed in the element 12, the latter being thereby pivotally mounted relative to the plate 10 with the possibility of moving longitudinally of the plate 10 to the extent permitted by the length of the slot 14. The edge 12A of the element 12 facing the projection 11 is formed with teeth thereon, as by knurling, corresponding to those on the projection 11 and the element is normally held firmly against the projection by a spring 15 acting between the plate 10 and pin 13 so that the respective teeth on the element 12 and projection 11 are held firmly in engagement. The edge 12A of the element 12 is arcuate and lies on a circle centred on the pin 13.

The element 12 is provided with a further depending projection 16 positioned adjacent an upstanding lug 17 of the web of the shoe 1. In the illustrated inoperative condition of the brake, a gap exists between the projection 16 and lug 17, corresponding to the desired maximum shoe to drum clearance of the brake.

In operation, outward movement of the shoes by the actuator 4 through a distance which does not exceed the aforesaid gap will not actuate the adjuster. When shoe movement exceeds that distance, however, the pin 16 is engaged by the lug 17 and moved, against the action of the spring 15, to disengage the teeth on its edge 12A from those on the projection 11. When this happens, the element 12 is rotated by further outward movement of the shoe 1 through an angle corresponding to the excess shoe movement, so that when the brake is released, the element becomes re-engaged with the projection 11, under the action of the spring 15, at a new angular position and held therein by the re-meshing teeth. An edge surface portion 12B (FIG. 2) of the element is in engagement with the web of the shoe 1 and has an arcuate form such that counter-clockwise adjusting movement of the element 12 brings a portion of the edge 12B of increasing radial extent into engagement with the shoe web. The effective length of the strut is thereby increased to hold the shoes in a new adjusted position nearer to the drum surface, upon release of the actuator 4.

Figure 3A:
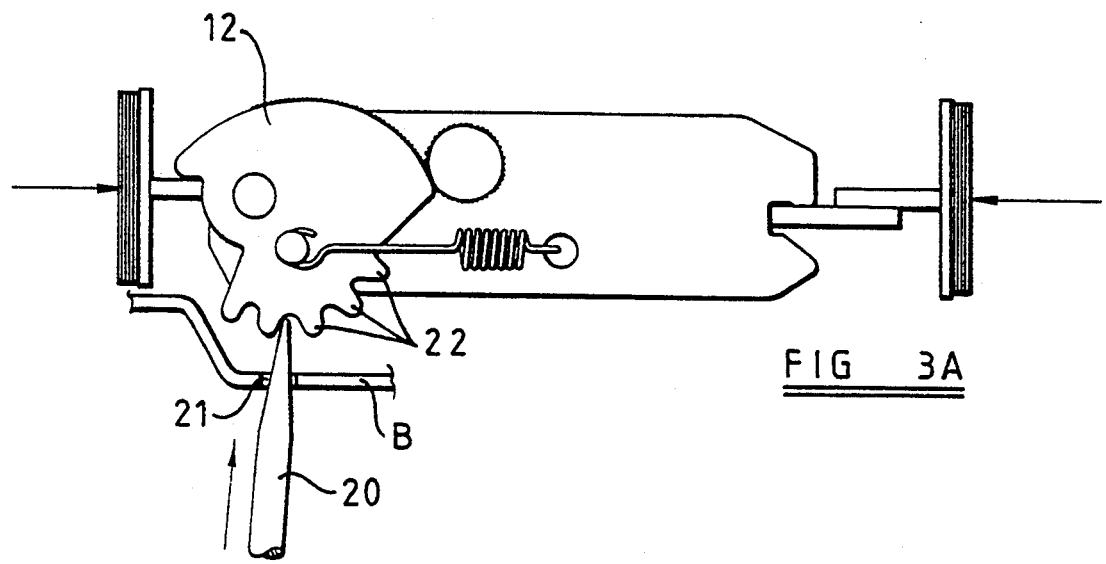
FIGS. 3A to 3C are views generally similar to FIG. 2 with some parts omitted and others modified, illustrating a sequence of steps in the de-adjustment of the adjuster.

When it is desired to dismantle the brake, in order, for example, to service it after an extended period of use, it is likely that the drum will have become grooved and will be prevented from axial withdrawal by engagement of the shoes within the groove. It is then necessary to de-adjust the adjuster to bring the shoes radially inwardly to positions in which they clear the groove and permit withdrawal of the drum. With a one-shot adjuster of the kind described, if the adjuster element 12 is at or near its maximum position of adjustment, as illustrated in FIG. 3A, a relatively large pivotal de-adjustment movement will be required in order to bring the shoes to the aforesaid position. De-adjustment is conveniently carried out by means of a tool 20, such as a screwdriver, inserted through a hole 21 in the backplate B and with some conventional arrangements of this type, difficulty can be experienced in pivoting the element though the necessary distance because of the available limited angular movement of the tool. In the arrangement of the invention, however, release means is provided in the form of a series of angularly spaced projections or teeth 22 on a peripheral edge portion of the element adjacent the hole 21. The projections are arranged generally radially of the pivotal center of the adjusting element, i.e. of the pin 13 and can be engaged in succession by the tool 20 in order to move the element through up to four angular de-adjusting increments.

Figure 3B:
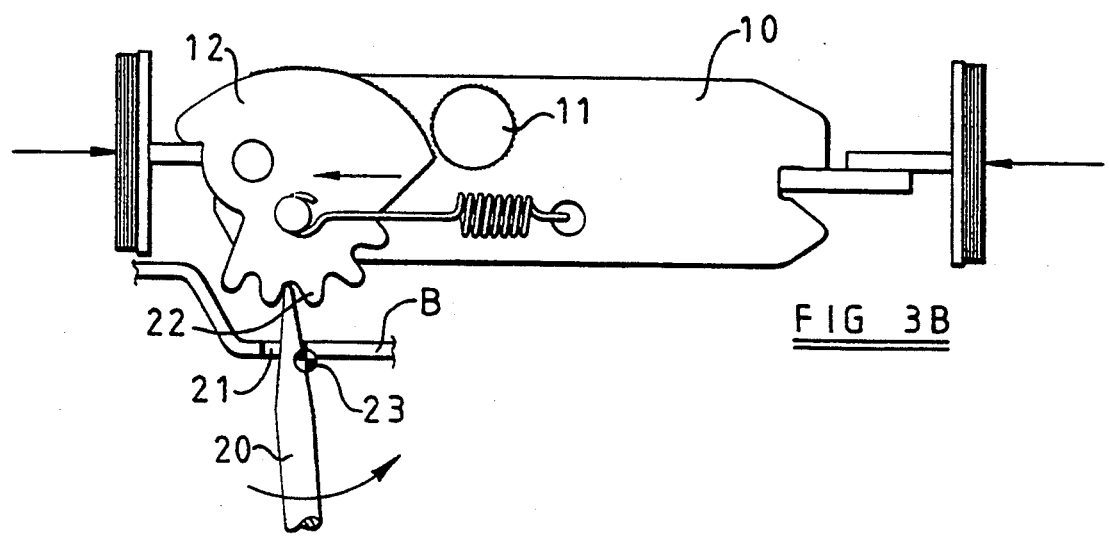
Figure 3C:
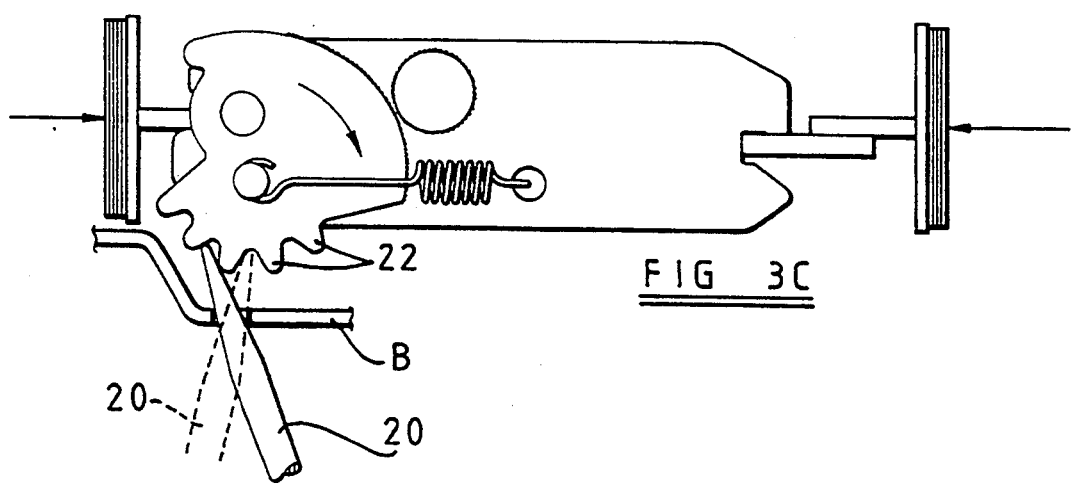

FIG. 3B illustrates a condition in which the tool 20, engaged with one of the projections 22, has been pivoted, using an edge 23 of the hole 21 as a fulcrum, to move the element 12 out of engagement with the projection 11 against the action of the spring 15, and FIG. 3C illustrates a further position in which the element has been de-adjusted through one increment of movement, the illustrated position of the element being that just prior to its re-engagement, by action of the shoe return springs, with the projection 11. If further de-adjusting movement is required, the tool 20 can then be withdrawn and re-inserted at a new position such as to engage the next projection 22 in succession, the new position of the tool being illustrated in broken lines. A second increment of de-adjustment can then be effected in the manner described above and the process could be repeated again, if necessary, using the third and fourth projections 22. The invention will be seen to provide a simple and efficient means for de-adjusting a one-shot adjuster in a shoe-drum brake.

It will be understood that various details of the brake and its adjuster may be modified without departing from the scope of the invention. Although five projections are shown in FIGS. 2 and 3A–3C, the number and shape of the projections 22 may be varied to suit the particular practical requirements. For example, four projections may be used.

We claim:

1. An internal shoe drum brake comprising a pair of brake shoes separable by actuating means into braking engagement with a brake drum, and an automatic adjuster in the form of a strut extending between the shoes which includes a pair of strut parts of which one is a toothed adjuster element pivotally mounted on the other strut part and cooperating with toothed means rigid with said other part, resilient means acting linearly in a direction longitudinally of the strut and serving to bias the strut parts so as to normally maintain the teeth of the adjuster element and the toothed means in engagement, the strut parts being operatively associated respectively with the shoes in such a manner that excessive separation of the shoes upon brake actuation results in separation of the teeth of the adjuster element and the toothed means and angular movement of the element, enabling said teeth to re-engage in a fresh position, upon brake release, to increase the effective length of the strut and thereby set a new outwardly adjusted retracted position of the shoes, the pivotal adjuster element being provided with release means arranged generally radially of a pivotal connection of the adjuster element with the other strut part and at a location generally diametrically opposed to the teeth of the adjuster element, said release means being adapted for engagement by an external tool in order to move the adjuster element generally longitudinally of the strut so as to disengage the adjuster element from the other strut part and thereby permit rotation of the adjuster element towards a de-adjusted position, the line of action of the resilient means being radially inwardly of said release means.

2. A brake according to claim 1, characterized in that the release means is arranged on a peripheral portion of the adjuster element.

3. A brake according to claim 2, characterized in that the release means is a series of peripherally spaced projections arranged to permit engagement of one thereof by the tool at any rotational position of the adjuster element within a normal range of adjusting movement.

4. A brake according to claim 3, characterized in that the projections extend generally radially of a pivotal center of the adjuster element.

5. A brake according to claim 3, characterized in that the projections extend from an edge surface of the adjuster element.

6. A brake according to claim 3, characterized in that four projections are provided.

7. A brake according to claim 3, characterized in that five projections are provided.

8. An internal shoe drum brake comprising a pair of brake shoes separable by actuating means into braking engagement with a brake drum, an automatic adjuster in the form of a strut extending between the shoes which includes a pair of strut parts of which one is a toothed adjuster element pivotally mounted on the other strut part and cooperating with toothed means rigid with said other part, resilient means for biasing the strut parts so as to normally maintain the teeth of the adjuster element and the toothed means in engagement, the adjuster element having force from the resilient means applied only to a pivotal connection of the adjuster element with the other strut part, the strut parts being operatively associated respectively with the shoes in such a manner that excessive separation of the shoes upon brake actuation results in separation of the teeth of the adjuster element and the toothed means and angular movement of the element, enabling said teeth to re-engage in a fresh position, upon brake release, to increase the effective length of the strut and thereby set a new outwardly adjusted retracted position of the shoes, the pivotal adjuster element being provided with release means arranged generally radially of the pivotal connection of the adjuster element with the other strut part and at a location generally diametrically opposed to the teeth of the adjuster element, said release means being adapted for engagement by an external tool in order to move the adjuster element generally longitudinally of the strut so as to disengage the adjuster element from the other strut part and thereby permit rotation of the adjuster element towards a de-adjusted position, the line of action of the resilient means being radially inwardly of said release means.

9. A brake according to claim 8, characterized in that the release means is arranged on a peripheral portion of the adjuster element.

10. A brake according to claim 9, characterized in that the release means is a series of peripherally spaced projections arranged to permit engagement of one thereof by the tool at any rotational position of the adjuster element within a normal range of adjusting movement.

11. A brake according to claim 10, characterized in that the projections extend generally radially of a pivotal center of the adjuster element.

12. A brake according to claim 10, characterized in that the projections extend from an edge surface of the adjuster element.

13. A brake according to claim 10, characterized in that four projections are provided.

14. A brake according to claim 10, characterized in that five projections are provided.

* * * * *